Figure 1:
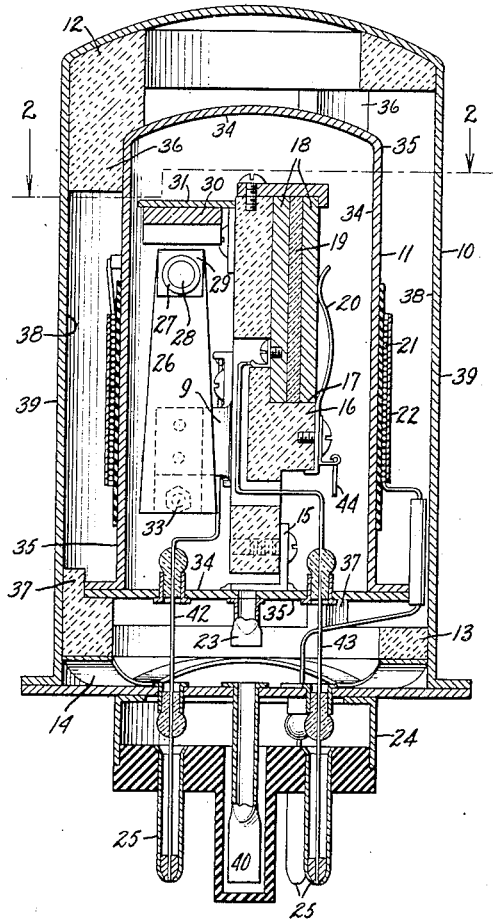

June 4, 1940.   C. U. PETERSON   2,203,545
PIEZOELECTRIC DEVICE
Filed June 18, 1938

Inventor:
Carl U. Peterson,
by Harry E. Dunham
His Attorney.

Patented June 4, 1940

2,203,545

UNITED STATES PATENT OFFICE 2,203,545

PIEZOELECTRIC DEVICE

Carl U. Peterson, Arlington, Va., assignor to General Electric Company, a corporation of New York Application June 18, 1938, Serial No. 214,604

3 Claims. (Cl. 171—327)

My invention relates to an improved holder for piezoelectric devices, and more particularly to an improved holder of the temperature-controlled type wherein the piezoelectric device is maintained at an elevated temperature above the temperature of the air surrounding the crystal holder.

The use of piezoelectric crystals in mobile and aircraft service has raised a number of problems not usually encountered in the use of such crystals in other types of communication service. A signal apparatus which contains as one of its elements a piezoelectric device may be subjected to extreme fluctuations of temperature and humidity as an aircraft starts from ground and ascends to a relatively high altitude, and may further be subjected to conditions of severe vibration and shock, which is inherently characteristic of the operation of aircraft and similar mobile craft. It is therefore essential that piezoelectric devices when used in aircraft and similar mobile service be supported in crystal holders which maintain the crystal under substantially constant conditions of temperature and humidity and in view of the great convenience of electrical heaters for maintaining the temperature of the crystal constant, it is necessary that the temperature responsive device which controls the supply of electric current to the heater shall be capable of operation under severe conditions of vibration with freedom from chattering of the circuit controlling contacts with which it is provided.

The necessity of dispensing with unnecessary weight in equipment carried by aircraft demands that not only unnecessary weight in the crystal holder be eliminated but also that the weight of the equipment necessary to maintain the crystal at an elevated temperature shall be a minimum. These requirements, coupled with the requirement that the crystal temperature shall not fluctuate more than one or two degrees or less, have raised problems in the use of piezoelectric crystals in these types of service which until the present moment have not been satisfactorily solved.

It is an object of my invention to provide a piezoelectric crystal holder especially suited for employment in mobile and aircraft service and one which is light in weight yet of simple and sturdy construction, inexpensive to manufacture, and capable of consistent and reliable operation under conditions of extreme vibration and shock and severe fluctuations in temperature and humidity.

A further object of my invention is to provide in a crystal holder a new and improved crystal housing which maintains the temperature of all points within the housing unusually uniform and within a few degrees of an average operating temperature. This desirable result in my invention is accomplished with a minimum of weight, and results in a minimum of weight in the auxiliary apparatus needed to maintain the crystal at its elevated temperature.

Figure 2:
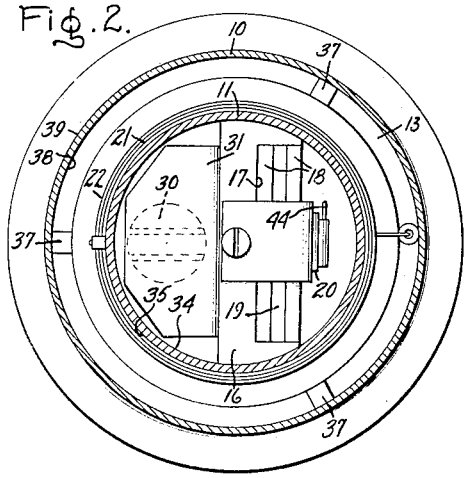
Figure 3:
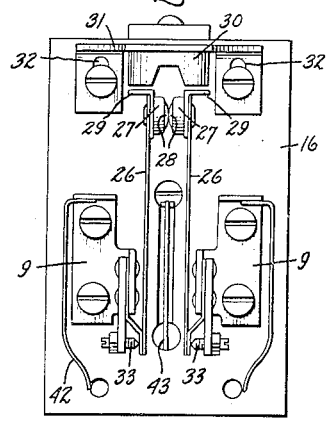
Figure 4:
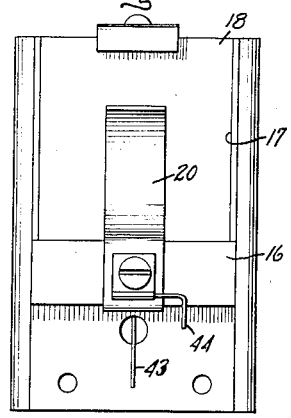

The novel features which I believe to be characteristic of my invention are pointed out with particularity in the appended claims. Other objects and advantages and the invention itself will best be understood by reference to the following description taken in connection with the accompanying drawing in which Fig. 1 shows in cross-sectioned elevation a crystal holder constructed in accordance with my invention, Fig. 2 represents a cross-section taken along line 2—2 of Fig. 1, and Figs. 3 and 4 represent respectively a front and a back view of the crystal electrode support which additionally supports the temperature controlling thermostat.

Referring particularly to Fig. 1, an outer housing 10 encloses an inner housing 11 which is spaced centrally of the outer housing by upper and lower heat insulating rings 12 and 13 respectively. The outer and inner housings are preferably of metal and the insulating rings 12, 13 therefore not only serve the purpose of thermally insulating the inner from the outer housing but additionally electrically insulate one housing from the other thereby to increase the effectiveness of the double electrical shield provided by the housings by enabling an electrical connection to be made between the housings at a single point. This arrangement of spacing insulators also enables the inner housing to be operated, should one desire, at an electrical potential different from that of the outer housing. The insulating rings 12, 13 may be of isolantite, steatite, lava, or the like. A spring member 14 maintains the inner housing 11 and the insulating rings 12, 13 in assembled position within the upper end of the outer housing 10 while allowing the inner housing 11 to expand or contract with changes of temperature.

Supported centrally of the inner housing 11 by a bracket 15 is a crystal electrode support 16 which is suitably recessed at 17 to receive a pair of crystal electrodes 18 between which is mounted a piezoelectric crystal 19. A spring 20 maintains the crystal electrodes in close engagement with the faces of the piezoelectric crystal.

An electrical heater 21 is wound in close heat transfer relation on the outside of the inner housing 11. The heater, in operation, maintains the piezoelectric crystal 19 at an elevated temperature above that of the air surrounding the outer container 10. Positioned on the outer surface of the heater 21 is a layer of brightly polished foil 22, of aluminum or the like, provided for a purpose to be explained hereinafter.

The inner housing 11 is preferably filled with an inert gas, as helium, hydrogen, argon, or the like, at a pressure which is preferably below atmospheric, and is thereafter hermetically sealed by sealing-off the stem 23.

The outer housing 10 has provided at its lower end a base 24 which, with its prongs 25, may be arranged to fit a standard vacuum tube socket.

The supply of electric current to the heater 21 is controlled by a heat responsive device shown more clearly in Fig. 3. This temperature responsive device is claimed in the copending United States patent application of Claude M. Hathaway, Serial No. 218,477, filed July 8, 1938, which is assigned to the same assignee as the present invention. This device comprises a pair of bimetallic elements 26, 26 which are supported from the crystal electrode support 16 by brackets 9, 9. The upper end of each bimetallic element 26 supports a sleeve of magnetic material 27 and a silver contact 28. Supported also on the upper end of each bimetallic element is an L-shaped member 29 of magnetic material which moves adjacent to a respective pole face of a permanent magnet 30. The magnet 30 is supported from the crystal electrode support 16 by a bracket 31 having elongated slots 32, 32 by which the air gap between the pole faces of the magnet 30 and the magnetic members 29, 29 may be adjusted. The operating temperature of the thermostat thus provided is determined by the position of the adjusting screws 33, 33 which bear against the lower ends of the bimetallic elements. The arrangement of the bimetallic elements in this manner with the magnetic members 29 in closely spaced relation to the pole faces of the magnet 30 provides a dynamically balanced thermostat characterized by a snap-opening and snap-closing operation and by great freedom from chattering of the contacts even under conditions of severe shock and vibration to which the temperature responsive device may be subjected.

Fig. 2 is a cross-sectional view taken along the plane 2—2 of Fig. 1. This view shows the coaxially arranged and spaced apart outer and inner housings 10, 11 and illustrates particularly well the positioning of the electrical heater 21 on an exterior surface of the inner housing with the crystal electrodes 18 and bimetallic elements 26, 26 compactly arranged within and in close heat transfer relation to the walls of the inner housing.

The view illustrated in Fig. 4 of the drawing is of the front face of the crystal electrode support 16 and shows the arrangement of the crystal electrodes 18 in position within the recess 17. The spring 20 bears upon the crystal electrode 18 approximately at the center of the electrode.

It is especially important in the use of piezoelectric devices which operate in a temperature controlled atmosphere that the entire atmosphere surrounding the crystal shall be at a substantially constant temperature and that the temperature of the crystal and its electrodes shall be very nearly the same as that of the thermostat or other temperature responsive device. Further, if large fluctuations in the temperature of the crystal are to be avoided, it is imperative that both the crystal and the temperature responsive device shall be maintained at a temperature as close as possible to that of the heater. A solution of the problems thus raised becomes exceedingly difficult where, as in certain forms of mobile and aircraft service, the temperature of the atmosphere surrounding the crystal must remain substantially constant while the temperature of the atmosphere surrounding the crystal holder may fluctuate rapidly over a range of from 75 degrees to 100 degrees F. or more.

My invention effectively solves in a singular manner the many difficult problems encountered in aircraft and similar service. The interior surfaces 34 of the inner housing 11 are provided with a black heat-absorbing coating by a treatment of the surfaces to oxidize them, or by coating the surfaces with an oxidized copper finish, or the like. It is a phenomenon of a black surface of this nature that the surface rapidly absorbs heat from a heat source and as rapidly distributes the heat thus absorbed in the form of radiated heat. By treating the interior walls of the inner housing 11 in this manner, heat energy from the heater 21 can flow rapidly by conduction through the metal walls of the inner housing 11 up over the top and down over the bottom of the inner housing to be rapidly absorbed by the black coating on the inner surfaces of the inner housing and as rapidly radiated by the black coating equally to all points in the interior of the housing. The provision of this black coating on the interior surfaces 34 of the inner housing is thus seen to have the equivalent effect of placing a heating winding over each unit area of surface of the inner housing 11 with the result that points in the interior of the housing 11 remote from the heater 21 are maintained at substantially the same temperature as is a point within the inner housing immediately adjacent the heater.

The provision of the blackened interior surfaces of the inner housing 11 and the consequent rapid transfer of heat energy from the heater 21 through the walls of the inner housing would be substantially nullified in their effect on the temperature of the interior of the housing were it not for the additional treatment given the exterior surfaces of the inner housing 11. This treatment consists in polishing to a high degree or otherwise treating the exterior surfaces 35 of the inner housing 11 to provide a heat reflective surface which very effectively prevents to a large extent the loss of heat energy by conduction and radiation to the outer housing 10. Additionally, a polished metal foil 22 having a heat reflective surface is provided over the heater 21 to direct the heat energy from the heater 21 inward to the metal walls of the inner housing 11.

The loss of heat energy to the outer housing 10 is further reduced by the provision of shouldered projections 36, 37 on the respective upper and lower insulating rings 12 and 13, by the treatment of the surfaces of the outer housing 10, and by the evacuation of the space between the inner and outer housings. The shouldered projections 36, 37 have a minimum area of contact between the insulating material of the rings and the inner housing and thereby effect a minimum loss of heat energy by conduction through the heat insulating rings 12, 13 to the outer housing 10. The heat energy loss by radiation to the outer housing 10 and from the outer housing to the surrounding atmosphere is reduced by treating the surfaces of the outer housing, as by polishing, electrical deposition of a suitable metal, or the like, to provide these surfaces with a heat reflective surface or coating. It is preferable to treat both the interior surfaces 38 and the exterior surfaces 39 of the outer housing 10 in this manner. The heat insulation between the inner housing 11 and the outer housing 10 is completed by evacuating the space between the housings thereby to eliminate convection and conduction heat energy losses through the medium immediately surrounding the inner housing 11. It has been observed that the evacuation itself reduces the heat energy which is required to maintain a 100 degrees C. temperature differential (between the piezoelectric crystal and the atmosphere surrounding the outer housing 10) to approximately 15% of that required before evacuation. The outer housing is hermetically sealed after evacuation by sealing-off the stem 40.

The exceptionally high degree of heat energy transfer from the heater 21 to the interior of the inner housing 11 provided by my construction reduces not only the weight of the crystal holder and the weight of the auxiliary equipment required to maintain the crystal at the required elevated temperature, but in addition greatly reduces the size of the electrical heater from that which it has heretofore been possible to use with crystal holders of this type. This has the important advantage that it enables for the first time the completion of an electrical circuit from the exterior of the crystal housing to the heater within the housing by electrical conductors which, carrying a greatly reduced heater current, are of a diameter sufficiently small that the heat energy loss by conduction through the electrical conductors becomes insignificant. The size of the conductors 42, 43 which (with other conductors, not shown) complete the electrical circuit from the base prongs 25 to the electrical heater 21 and the bimetallic elements 26, 26, are shown greatly enlarged in the drawing only for purposes of clearness. In like manner, the completion of an electrical circuit from selected prongs 25 to the crystal electrodes 18, as by the conductors 43, 44, is made by electrical conductors having the smallest diameter possible consistent with suitable mechanical strength thereby to reduce the heat energy loss by conduction through these wires.

It will now be evident that I have provided, with my construction, a temperature control housing or holder for a piezoelectric device which is light in weight, of sturdy construction, and one which meets the rigid requirements of a constant and uniform crystal temperature under the severe conditions of rapidly changing temperatures and extreme vibration encountered in mobile and aircraft service.

While I have shown a particular embodiment of my invention, I do not wish to be limited thereto since many modifications may be made in the arrangement and the elements employed, and I, therefore, contemplate by the appended claims to cover any such modifications as fall within the true spirit and scope of my invention.

What I claim as new and desire to secure by Letters Patent of the United States is:

1. The combination, in a constant temperature housing for piezoelectric devices, of inner and outer nested containers, each having side walls and a pair of opposite end walls, means for supporting a piezoelectric device within said inner container, thermal insulating means arranged between said containers to maintain the side walls and one end wall of each of said containers in spaced relation, said outer container being hermetically sealed and the space between said containers being evacuated, and resilient means between the other end walls of said containers for maintaining said inner container pressed away from the other end wall of said outer container to maintain said means and said inner container in assembled relation within said outer container while allowing said inner container to expand and contract with changes in temperature.

2. The combination, in a constant temperature housing for piezoelectric devices, of inner and outer nested containers, means for supporting a piezoelectric device within said inner container, thermal insulating means including shouldered rings arranged between said containers to maintain said containers in spaced relation, the ends of said inner container engaging the shoulders on said rings, said outer container being hermetically sealed and the space between said containers being evacuated, and resilient means for biasing said rings and said inner container to one end of said outer container for maintaining said rings and said inner container in assembled relation while allowing said inner container to expand and contract with changes of temperature.

3. The combination in a constant temperature housing for piezoelectric devices, of inner and outer nested containers, means for supporting a piezoelectric device within said inner container, said inner container being filled with an inert gas of high heat conductivity and having blackened inner walls and polished reflecting outer walls, thermal insulating shouldered rings interposed between said containers for maintaining said inner container centered axially and out of contact with the ends of said outer container, said inner container engaging the shoulder on said rings, said outer container being hermetically sealed and the space between said containers being evacuated, and resilient means between one of said rings and an end wall of said outer container for pressing said rings and said inner container toward the other end wall of said outer container to maintain said rings and said containers in assembled relation while allowing said inner container to expand and contract with changes of temperature.

CARL U. PETERSON.